United States Patent [19]
Owen, Jr.

[11] Patent Number: 6,056,168
[45] Date of Patent: May 2, 2000

[54] FUEL TANK FOR A TRAILER

[76] Inventor: Robert Davis Owen, Jr., 1078 W. Wingate St., Covina, Calif. 91724

[21] Appl. No.: 09/282,249

[22] Filed: Mar. 31, 1999

[51] Int. Cl.[7] .......................................................... B60P 3/22
[52] U.S. Cl. ........................... 222/608; 222/626; 137/899; 137/355.16; 280/839; 141/231
[58] Field of Search ..................................... 222/608, 626, 222/628; 141/231, 382; 137/899, 355.16; 280/830, 831, 834–839

[56] References Cited

U.S. PATENT DOCUMENTS

| | | | |
|---|---|---|---|
| 2,421,765 | 6/1947 | Taylor | 280/839 |
| 2,498,229 | 2/1950 | Adler | 280/837 |
| 2,784,747 | 3/1957 | Weempe | 141/231 |
| 3,250,437 | 5/1966 | Smith | 137/355.16 |
| 3,697,093 | 10/1972 | Cadiou | 280/834 |
| 3,869,012 | 3/1975 | Schubach | 280/831 |
| 3,884,255 | 5/1975 | Merkle | 137/265 |
| 4,171,114 | 10/1979 | Marden | 244/116 |
| 4,988,020 | 1/1991 | Webb | 222/608 |
| 5,002,325 | 3/1991 | Fought et al. | 280/830 |
| 5,052,443 | 10/1991 | Evangelist, Jr. | 137/899 |
| 5,135,258 | 8/1992 | Buxton | 280/839 |
| 5,318,314 | 6/1994 | Cyphers et al. | 222/608 |
| 5,365,980 | 11/1994 | DeBerardinis | 141/231 |
| 5,667,113 | 9/1997 | Clarke et al. | 222/608 |
| 5,692,647 | 12/1997 | Brodie | 222/608 |

*Primary Examiner*—J. Casimer Jacyna
*Attorney, Agent, or Firm*—Goldstein & Canino

[57] ABSTRACT

A fuel tank for a trailer including a tank that is adapted for securement to an underside of a trailer. The tank has a generally trapezoidal configuration with a top face and a bottom face. The top face has recesses formed therein for receiving cross members of the trailer therein. The top face has a filling port in communication with an interior of the tank. A dispensing nozzle is in communication with a fuel pump disposed within the interior of the tank. A deflector shield is secured to the underside of the trailer forwardly of the tank. The shield is dimensioned for covering a forward portion of the tank.

5 Claims, 2 Drawing Sheets

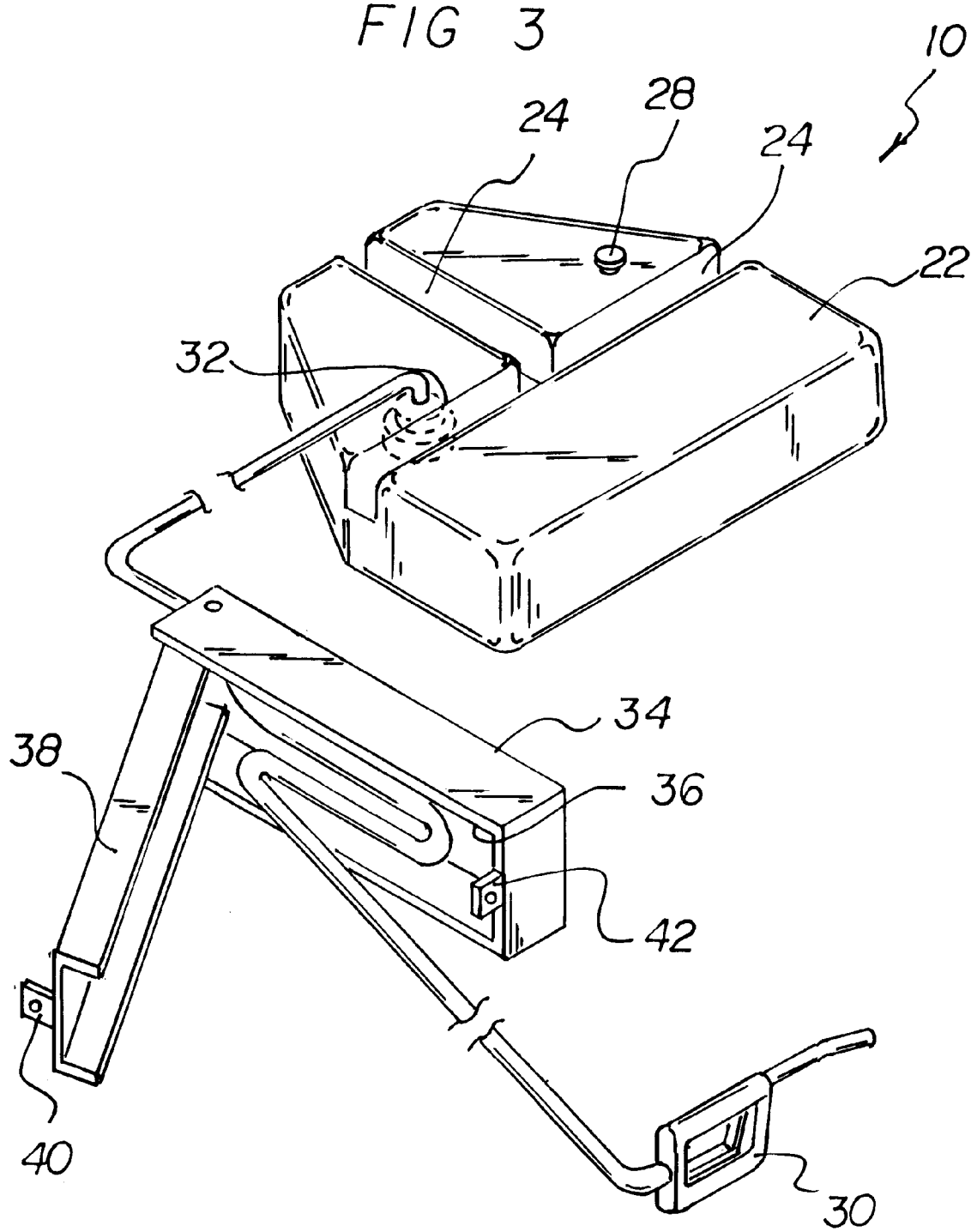

6,056,168

FUEL TANK FOR A TRAILER

BACKGROUND OF THE INVENTION

The present invention relates to a fuel tank for a trailer and more particularly pertains to expediting the fueling process of trailer-able vehicles.

The use of trailers to transfer vehicles, such as jet skis, boats, motorcycles, and off-road vehicles, are well known in the art. Usually, when carrying one of these vehicles, the owner is required to carry a separate gas tank that will be used to fill the carried vehicle with fuel once the destination is reached. Most people do not like carrying a separate gas tank, which is usually held loose within a parent vehicle, because of the potential hazard that exists when transporting fuel.

The present invention seeks to provide a tank that is secured to a trailer with a nozzle that can be extended outwardly to reach the fuel tank of the vehicle on the trailer.

The use of fuel tanks is known in the prior art. More specifically, fuel tanks heretofore devised and utilized for the purpose of holding quantities of fuel are known to consist basically of familiar, expected and obvious structural configurations, notwithstanding the myriad of designs encompassed by the crowded prior art which have been developed for the fulfillment of countless objectives and requirements.

While these devices fulfill their respective, particular objective and requirements, the aforementioned patents do not describe a fuel tank for a trailer for expediting the fueling process of trailer-able vehicles.

In this respect, the fuel tank for a trailer according to the present invention substantially departs from the conventional concepts and designs of the prior art, and in doing so provides an apparatus primarily developed for the purpose of expediting the fueling process of trailer-able vehicles.

Therefore, it can be appreciated that there exists a continuing need for new and improved fuel tank for a trailer which can be used for expediting the fueling process of trailer-able vehicles. In this regard, the present invention substantially fulfills this need.

SUMMARY OF THE INVENTION

In the view of the foregoing disadvantages inherent in the known types of fuel tanks now present in the prior art, the present invention provides an improved fuel tank for a trailer. As such, the general purpose of the present invention, which will be described subsequently in greater detail, is to provide a new and improved fuel tank for a trailer and method which has all the advantages of the prior art and none of the disadvantages.

To attain this, the present invention essentially comprises a trailer comprised of a frame portion and a pair of rear wheels. The frame portion includes a rectangular back portion and a triangular front portion. The front portion has a hitch extending forwardly therefrom for mating with a hitch on a rear of a towing vehicle. A tank is provided that is adapted for securement to an underside of the triangular front portion of the trailer. The tank has a generally trapezoidal configuration with a top face and a bottom face. The top face has recesses formed therein for receiving cross members of the triangular front portion therein. The top face has a filling port in communication with an interior of the tank. A dispensing nozzle is in communication with a fuel pump disposed within the interior of the tank. The dispensing nozzle is received within a storage housing secured to a side of the trailer. The storage housing has an open front face for receiving the nozzle. The open front face has a lid hingedly coupled therewith. The lid has a tab extending outwardly from a leading edge thereof with a corresponding tab on a leading edge of the storage housing for receiving a padlock through aligned apertures thereof when the lid is closed against the open front face of the storage housing. A deflector shield is secured to the underside of the triangular front portion of the trailer forwardly of the tank. The shield is dimensioned for covering a forward portion of the tank.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fuel tank for a trailer which has all the advantages of the prior art fuel tanks and none of the disadvantages.

It is another object of the present invention to provide a new and improved fuel tank for a trailer which may be easily and efficiently manufactured and marketed.

It is a further object of the present invention to provide a new and improved fuel tank for a trailer which is of durable and reliable construction.

An even further object of the present invention is to provide a new and improved fuel tank for a trailer which is susceptible of a low cost of manufacture with regard to both materials and labor, and which accordingly is then susceptible of low prices of sale to the consuming public, thereby making such a fuel tank for a trailer economically available to the buying public.

Even still another object of the present invention is to provide a new and improved fuel tank for a trailer for expediting the fueling process of trailer-able vehicles.

Lastly, it is an object of the present invention to provide a new and improved fuel tank for a trailer including a tank that is adapted for securement to an underside of a trailer.

The tank has a generally trapezoidal configuration with a top face and a bottom face. The top face has recesses formed therein for receiving cross members of the trailer therein. The top face has a filling port in communication with an interior of the tank.

A dispensing nozzle is in communication with a fuel pump disposed within the interior of the tank. A deflector shield is secured to the underside of the trailer forwardly of the tank. The shield is dimensioned for covering a forward portion of the tank.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is an isolated perspective view of the present invention.

The same reference numerals refer to the same parts through the various figures.

DESCRIPTION OF THE PREFERRED EMBODIMENT

Figure 1:
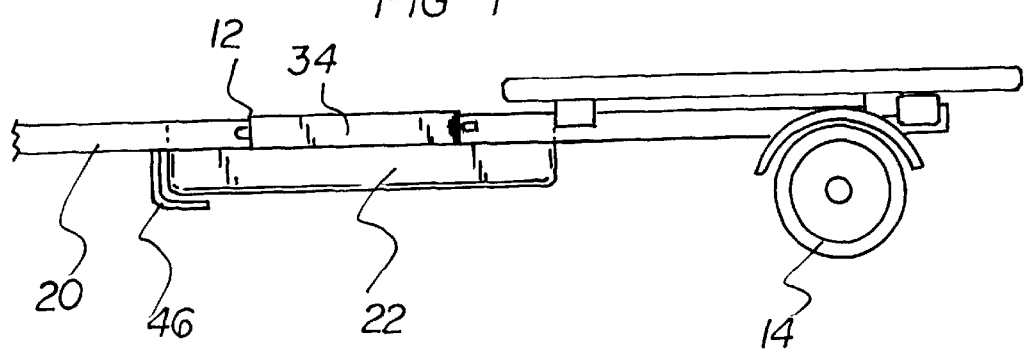
FIG. 1 is a side view of the preferred embodiment of the fuel tank for a trailer constructed in accordance with the principles of the present invention illustrated secured to a trailer.
Figure 2:
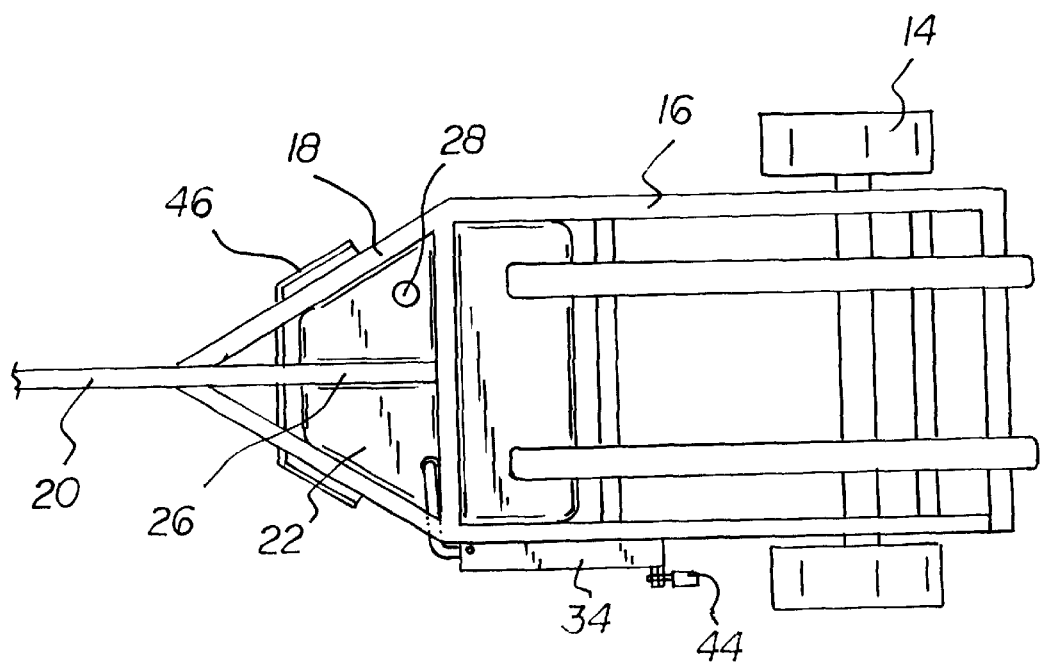
FIG. 2 is a top plan view of the present invention illustrated secured to a trailer.

With reference now to the drawings, and in particular, to FIGS. 1 through 3 thereof, the preferred embodiment of the new and improved fuel tank for a trailer embodying the principles and concepts of the present invention and generally designated by the reference number 10 will be described.

Specifically, it will be noted in the various Figures that the device relates to a fuel tank for a trailer for expediting the fueling process of trailer-able vehicles. In its broadest context, the device consists of a trailer, a tank, a dispensing nozzle, and a deflector shield. Such components are individually configured and correlated with respect to each other so as to attain the desired objective.

The trailer 12 is comprised of a frame portion and a pair of rear wheels 14. The frame portion includes a rectangular back portion 16 and a triangular front portion 18. The front portion 18 has a hitch 20 extending forwardly therefrom for mating with a hitch on a rear of a towing vehicle. Note FIGS. 1 and 2. The exact dimensions of the trailer 12 can vary to accommodate different uses and different vehicles.

The tank 22 is adapted for securement to an underside of the triangular front portion 18 of the trailer 12. The tank 22 has a generally trapezoidal configuration with a top face and a bottom face. The top face has recesses 24 formed therein for receiving cross members 26 of the triangular front portion 18 therein. The top face has a filling port 28 in communication with an interior of the tank 22.

The dispensing nozzle 30 is in communication with a fuel pump 32 disposed within the interior of the tank 22. The dispensing nozzle 30 is received within a storage housing 34 secured to a side of the trailer 12. The storage housing 34 has an open front face 36 for receiving the nozzle 30. The open front face 36 has a lid 38 hingedly coupled therewith. The lid 38 has a tab 40 extending outwardly from a leading edge thereof with a corresponding tab 42 on a leading edge of the storage housing 34 for receiving a padlock 44 through aligned apertures thereof when the lid 38 is closed against the open front face 36 of the storage housing 34.

The deflector shield 46 is secured to the underside of the triangular front portion 18 of the trailer 12 forwardly of the tank 22. The shield 46 is dimensioned for covering a forward portion of the tank 22. The shield 46 will protect the tank 22 from debris that is thrown at the tank 22 while the trailer 12 is being transported.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the united states is as follows:

1. A fuel tank for a trailer for expediting the fueling process of trailer-able vehicles comprising, in combination:

a trailer comprised of a frame portion and a pair of rear wheels, the frame portion including a rectangular back portion and a triangular front portion, the front portion having a hitch extending forwardly therefrom for mating with a hitch on a rear of a towing vehicle;

a tank adapted for securement to an underside of the triangular front portion of the trailer, the tank having a generally trapezoidal configuration with a top face and a bottom face, the top face having recesses formed therein for receiving cross members of the triangular front portion therein, the top face having a filling port in communication with an interior of the tank;

a dispensing nozzle being in communication with a fuel pump disposed within the interior of the tank, the dispensing nozzle being received within a storage housing secured to a side of the trailer, the storage housing having an open front face for receiving the nozzle, the open front face having a lid hingedly coupled therewith, the lid having a tab extending outwardly from a leading edge thereof with a corresponding tab on a leading edge of the storage housing for receiving a padlock through aligned apertures thereof when the lid is closed against the open front face of the storage housing;

a deflector shield secured to the underside of the triangular front portion of the trailer forwardly of the tank, the shield being dimensioned for covering a forward portion of the tank.

2. A fuel tank for a trailer for expediting the fueling process of trailer-able vehicles comprising, in combination:

a tank adapted for securement to an underside of a trailer, the tank having a generally trapezoidal configuration with a top face and a bottom face, the top face having recesses formed therein for receiving cross members of the trailer therein, the top face having a filling port in communication with an interior of the tank;

a dispensing nozzle being in communication with a fuel pump disposed within the interior of the tank;

a deflector shield secured to the underside of the trailer forwardly of the tank, the shield being dimensioned for covering a forward portion of the tank.

3. The fuel tank for a trailer as set forth in claim 2 wherein the dispensing nozzle is received within a storage housing secured to a side of the trailer.

4. The fuel tank for a trailer as set forth in claim 3 wherein the storage housing has an open front face for receiving the nozzle, the open front face having a lid hingedly coupled therewith.

5. The fuel tank for a trailer as set forth in claim 4 wherein the lid has a tab extending outwardly from a leading edge thereof with a corresponding tab on a leading edge of the storage housing for receiving a padlock through aligned apertures thereof when the lid is closed against the open front face of the storage housing.

\* \* \* \* \*